United States Patent [19]

Shields

[11] 4,063,418

[45] Dec. 20, 1977

[54] POWER PRODUCING SYSTEM EMPLOYING GEOTHERMALLY HEATED FLUID

[75] Inventor: J. Rodger Shields, Pittsburgh, Pa.

[73] Assignee: Carrier Corporation, Syracuse, N.Y.

[21] Appl. No.: 655,179

[22] Filed: Feb. 4, 1976

[51] Int. Cl.² .................................................. F03G 7/00
[52] U.S. Cl. ............................................. 60/641; 60/688; 60/689
[58] Field of Search ................... 60/641, 685, 688, 689

[56] References Cited

U.S. PATENT DOCUMENTS

| | | | |
|---|---|---|---|
| 3,862,545 | 1/1975 | Ellis et al. | 60/641 |
| 3,988,895 | 11/1976 | Sheinbaum | 60/641 |

Primary Examiner—Allen M. Ostrager
Attorney, Agent, or Firm—J. Raymond Curtin; Barry E. Deutsch

[57] ABSTRACT

A power producing system includes a source of geothermally heated fluid having inorganic salts dissolved therein. The fluid is directed through a first direct contact heat exchanger in heat transfer relation with a working fluid of a type insoluble in a liquid including inorganic salts. The vaporous working fluid thus produced is expanded through a prime mover and then directed through a second direct contact heat exchanger. The vaporous fluid is condensed in said second direct contact heat exchanger by passing in heat transfer relation with a relatively cold heat exchange medium comprising a liquid brine solution. The condensed working fluid is thereafter returned to the first direct contact heat exchanger for repeated reuse in the cycle. Inorganic salts are mixed with either the geothermal heated fluid or the relatively cold heat exchange medium to maintain the percentage by weight of inorganic salt in each of the fluids above a predetermined value to prevent the working fluid from being absorbed therein.

10 Claims, 1 Drawing Figure

U.S. Patent     Dec. 20, 1977     4,063,418
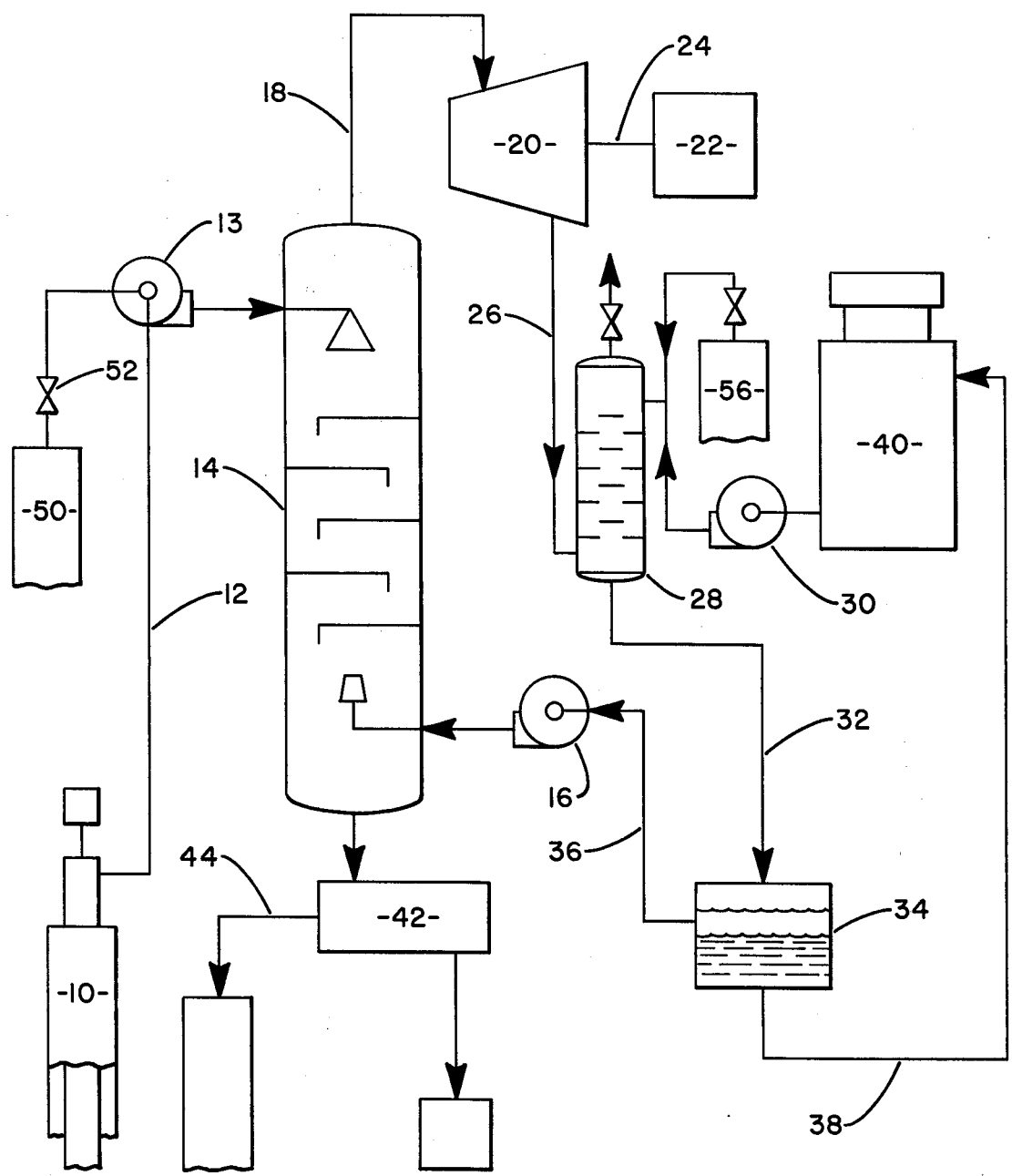

POWER PRODUCING SYSTEM EMPLOYING GEOTHERMALLY HEATED FLUID

BACKGROUND OF THE INVENTION

This invention relates to power producing systems, and in particular, to such systems employing geothermally heated fluid as a source of energy.

One of the dark clouds hovering over the economic future of mankind is the fact that the known resources of fossil fuels are being depleted at a relatively rapid rate. In fact, it is estimated that such known resources will be depleted sometime during the twenty-first century if current growth rates are continued. Vast sums of money are being invested in research by the industrial nations to develop alternate sources of energy.

In searching for new sources of energy, one of the chief desirable characteristics for such new source is that the source be of a non-polluting type. For example, the utilization of nuclear energy has been partially limited by the fear of radiation pollution affecting the nearby populous. In addition, there has been a further fear of thermal pollution of the streams, lakes, or rivers used as the heat sink for the nuclear generating plants.

A potential source of non-polluting energy is the development and utilization of geothermal heat. Currently, in several parts of the world, for example, Northern California, Italy, and Japan, geothermal fluids are employed as a source of energy for the generation of power. The geothermal fields thus employed have been frequently referred to as "dry steam" fields. That is to say, the geothermal fluid in the fields of the wellhead is steam rather than liquid water. Heretofore, it has been the practice to develop only the dry steam fields as the geothermal steam may be directly employed to drive a prime mover, such as a vapor driven turbine.

One of the major problems heretofore encountered in directly employing the geothermal fluid, even when such fluid is in the form of "dry steam" has been the fact that the geothermal fluid generally contains dissolved salts and other corrosive particulate matter which, if directly expanded in a prime mover, quickly results in erosion and destruction of critical parts thereof. Hence, it has been suggested to indirectly use the geothermal fluid to heat a heat transfer or working fluid, for example isobutane, whereby the isobutane is then employed to drive the prime mover. Heretofore, one of the problems associated with systems of this type has been the tendency for the dissolved material to be deposited on the tubes of the heat exchangers. The deposition of the dissolved minerals has reduced the operating efficiencies of the systems and has also increased maintenance costs. An example of a system of the foregoing type is illustrated in U.S. Pat. No. 3,845,627. In the aforecited United States patent, a heat transfer fluid is placed into direct contact with the geothermal fluid and then the heat transfer fluid is employed to vaporize a working fluid such as isobutane. A direct contact heat exchanger is employed to effect the transfer of heat from the geothermal fluid to the heat transfer fluid. As such, it is necessary that the heat transfer fluid be selected so that salt and other minerals in the geothermal fluid are insoluble in the heat transfer fluid. The use of a direct contact heat exchanger has minimized the problems described hereinabove.

Another problem associated with the use of a secondary or working fluid such as isobutane, relates to the vast quantities of working fluid circulated per day in any commercial system employing geothermally heated fluid to vaporize the working fluid. If even one part in ten thousand of the working fluid is lost through absorption into the geothermal fluid, the system may not be run economically.

The use of direct contact condensers in power generating systems employing geothermal fluids is also known, as for example illustrated in U.S. Pat. Nos. 3,774,392 and 3,751,673. However, in none of the foregoing cited patents, is it recognized that by maintaining the concentration of inorganic salts in the geothermal fluid, or in the condensing fluid, at a sufficient level, a working medium, such as isobutane, may be passed directly in heat transfer relation with such fluids. In essence, the more soluble solute in a fluid will displace or "salt out" a less soluble solute. Since isobutane is substantially less soluble in the geothermal and condensing fluids then are the inorganic salts, the dissolved salts will prevent the loss of the working medium into the geothermal and condensing fluids. The recognition of such fact results in a much more compact and relatively inexpensive power generating system.

SUMMARY OF THE INVENTION

It is an object of this invention to pass a working fluid in direct contact with a geothermal heated fluid to vaporize the fluid whereby the working fluid may be employed to operate a prime mover.

It is a further object of this invention to improve the efficiency and reduce the installation cost of power generating systems utilizing geothermally heated fluid.

It is a further object of this invention to reduce the maintenance cost involved in employing geothermally heated fluid in power producing systems.

These and other objects of the present invention are attained in a power producing system employing geothermally heated fluid. The geothermally heated fluid is supplied to a direct contact heat exchanger where it is passed in heat transfer relation with a working fluid. The working fluid is preferably an organic fluid of the type that is insoluble in a solution containing inorganic salts. The working fluid is vaporized and thereafter delivered to a prime mover wherein it is expanded to cause the prime mover to generate power. The expanded working fluid is exhausted to a second direct contact heat exchanger where it is passed in heat transfer relation with a relatively cold heat transfer medium comprising a salt solution wherein the working fluid is condensed. The condensed working is thereafter returned to the first direct contact heat exchanger for reuse in the cycle. A quantity of inorganic salts is mixed with either the geothermally heated fluid or the relatively cold heat transfer medium at a point upstream of the first and second direct contact heat exchangers to maintain the percentage by weight of inorganic salts in the geothermally heated fluid and the relatively cold heat transfer medium above a predetermined value to prevent the working fluid from being absorbed by the geothermally heated fluid or the relatively cold heat transfer medium.

BRIEF DESCRIPTION OF THE DRAWING

The FIGURE of the drawing schematically illustrates a power producing system in accordance with the instant invention.

DESCRIPTION OF THE PREFERRED EMBODIMENT

Referring now to the drawing, there is disclosed a preferred embodiment of the present invention. The power generating system is schematically illustrated and includes a source of geothermally heated fluid shown as well 10. For purposes of illustration, it is assumed the hot fluid comes from the geothermal well containing a large amount of dissolved inorganic salts and other materials. At the surface of the well, the fluid may be at a temperature between 350° F to 600° F (although only in rare instances above 375° F) and at a pressure between 80 to 90 psig, or even higher.

The hot geothermal fluid is led from well 10 via conduit 12 through a pump 13, to a first direct contact heat exchanger 14. Pump 13 is provided to increase the pressure of the fluid to a desired level in accordance with the operating characteristics of prime mover 20 employed in the system. The geothermal fluid is passed into the interior portion of heat exchanger 14 where it is passed in heat transfer relation with a relatively cold working fluid, such as liquid isobutane supplied to heat exchanger 14 via pump 16. The working fluid is chosen to be insoluble in a solution containing dissolved inorganic salts. The high temperature geothermal fluid vaporizes the working fluid whereby the working fluid passes from the heat exchanger through conduit 18 to prime mover 20, shown as a turbine. The flow rates of the working fluid and geothermally heated fluid are controlled to insure that all of the working fluid delivered to heat exchanger 14 is vaporized therein. The pressure of the isobutane vapor at the turbine inlet would probably fall within the range of 350 to 500 psig. The temperature of the vapor at the turbine inlet will vary in accordance with the temperature of the geothermal fluid. For example, if the geothermal fluid is at a temperature of 375° F, the temperature of the working fluid vapor at the turbine inlet may be as high as 325° F.

The vaporous insobutane is expanded through turbine 20 to cause the turbine to rotate. A generator 22 is preferably coupled to turbine output shaft 24 whereby rotation of the turbine will result in the generation of electricity.

The expanded isobutane vapor is exhausted from the turbine and passes through conduit 26. The isobutane vapor pressure at the turbine exhaust may be in the neighborhood of 50 to 80 psig and be at a temperature of 100° F.

Conduit 26 delivers the isobutane vapor to a second direct contact heat exchanger 28 functioning as a condenser. A relatively cold heat transfer medium comprising an inorganic salt solution is supplied to heat exchanger 28 via pump 30. The relatively cold heat transfer medium condenses the vaporous isobutane. The brine solution and condensed isobutane are supplied via conduit 32 to a separator 34. The liquid isobutane is lighter than the brine solution. Extremely small quantities of any isobutane which may have been absorbed by the brine solution are removed therefrom in separator 34. The liquid isobutane is delivered from separator 34, via conduit 36, to the suction side of pump 16 for delivery to first heat exchanger 14.

The warm salt water solution exiting from the separator is delivered via conduit 38 to a cooling means, for example cooling tower 40, wherein the warm salt water solution is cooled for eventual resupply to second direct contact heat exchanger 28.

If desired, the cold brine exiting from first direct contact heat exchanger 14 may be delivered to a separating device known as a clarifier 42 wherein solid particulate matter may be removed therefrom for eventual separate recovery. The dilute brine may then be returned to the geothermal well via reinjection through conduit means 44.

The foregoing system takes advantage of the fact that an inorganic fluid such as isobutane is generally insoluble in a solution containing inorganic salts, such as sodium chloride, calcium chloride, or sodium sulphate. In direct contact heat exchanger 14 wherein the liquid isobutane is vaporized by direct contact with the hot geothermal fluid, the fluid has naturally dissolved inorganic salt contained therein. The inorganic salts prevent the geothermal fluid from absorbing any of the isobutance working fluid. The geothermal fluid delivered to the direct contact heat exchanger should be monitored to insure that such fluid contains a sufficient weight of inorganic salt to insure that the working fluid remains insoluble with respect to the geothermal fluid. If the geothermal fluid does not have a sufficient quantity of inorganic salts, a separate supply or source 50 of inorganic salt should be provided. Valve 52 can be opened to provide a quantity of the inorganic salt from source 50 to a point located upstream of direct contact heat exchanger 14 to maintain the desired percentage by weight of inorganic salts in the geothermal fluid. Preferably, the geothermal fluid should contain at least ten percent by weight of inorganic salts.

Similarly, the condensing solution supplied to second direct contact heat exchanger 28 should also contain sufficient quantities by weight of inorganic salts to prevent the solution therein of the condensed isobutane fluid. If, for any reason, the relatively cold brine heat transfer medium should fall below the predetermined value, a separate source 56 of inorganic salts is provided whereby the salt may be delivered to the brine heat transfer medium upstream of the second direct contact heat exchanger.

Because of the vast amount of working fluid circulated per day in any commerical system employing geothermally heated fluid to vaporize a working fluid such as isobutane, the solubility of the isobutane in the geothermal fluid or in the condensing fluid has to be essentially zero. For example, if one part in ten thousand of the isobutane fluid is absorbed into the geothermal fluid or into the condensing fluid, the system may not be run economically. Hence, by maintaining the quantity of inorganic salts in the geothermal fluid and the condensing brine solution at a predetermined minimum value, the solubility of the working fluid into the two heat transfer brine media approaches zero. Hence, direct contact heat exchangers may be satisfactorily employed in geothermal fluid systems thereby improving the efficiency of such systems since the direct contact heat exchangers will not suffer from clogging or other problems associated with surface or tube-in-tube condensers.

While a preferred embodiment of the present invention has been described and illustrated, the invention should not be limited thereto but may be otherwise embodied within the scope of the following claims.

I claim:
1. A power generating system comprising:
    a source of geothermally heated fluid having a quantity of inorganic salts dissolved therein;

a first direct contact heat exchanger connected to said source of geothermally heated fluid;

means to supply a working fluid of a type substantially insoluble in a fluid containing dissolved inorganic salts to said direct contact heat exchanger, said working fluid being vaporized as a result of moving into direct contact heat transfer relation with said geothermally heated fluid;

expansion means connected to said direct contact heat exchanger, with said working fluid being delivered to the inlet of said expansion means whereby the fluid is expanded therethrough;

a second direct contact heat exchanger connected to the outlet of said expansion means to receive the working fluid exhausted therefrom; and means to supply a relatively cold heat transfer medium comprising a liquid salt solution to said second direct contact heat exchanger to condense said working fluid, with said condensed working fluid being returned to said first direct contact heat exchanger for reuse in said cycle.

2. A power generating system in accordance with claim 1 further including:

a first source of inorganic salt; and means to supply said inorganic salt from said first source to mix with said geothermally heated fluid upstream of said first direct contact heat exchanger to maintain the percentage by weight of inorganic salt in said geothermally heated fluid above a predetermined value to prevent said working fluid from being absorbed by said geothermally heated fluid in said first direct contact heat exchanger.

3. A power generating system in accordance with claim 2 further comprising:

a second source of inorganic salt; and means to supply said inorganic salt from said second source to mix with said relatively cold heat transfer medium upstream of said second direct contact heat exchanger to maintain the percentage by weight of inorganic salt in said relatively cold heat transfer medium above a predetermined value to prevent said working fluid from being absorbed by said medium in said second direct contact heat exchanger.

4. A power generating system in accordance with claim 1 wherein said working fluid is isobutane.

5. A method of producing power comprising the steps of:

providing a constant supply of geothermally heated fluid having a quantity of dissolved inorganic salts;

supplying the geothermally heated fluid to a first direct contact heat exchanger;

supplying a working fluid of a type substantially insoluble in a fluid containing dissolved inorganic salts to said first direct contact heat exchanger, the geothermally heated fluid vaporizing said working fluid;

delivering the vaporous working fluid to a prime mover wherein the working fluid is expanded to drive said prime mover;

directing the expanded working fluid exhausted from said prime mover to a second direct contact heat exchanger;

supplying a relatively cold heat exchange medium comprising a liquid salt solution to said second direct contact heat exchanger to condense said working fluid; and supplying said condensed working fluid to said first direct contact heat exchanger for reuse in the cycle.

6. A method of producing power in accordance with claim 5 further comprising the steps of:

mixing a quantity of inorganic salt with said geothermally heated fluid upstream of said first direct contact heat exchanger to maintain the percentage by weight of inorganic salts in said geothermally heated fluid above a predetermined value to prevent the working fluid from being absorbed therein.

7. A method in accordance with claim 6 further comprising the steps of:

mixing a quantity of inorganic salt with said relatively cold heat transfer medium upstream of said second heat exchanger to maintain the percentage by weight of inorganic salt in said relatively cold heat transfer medium above a predetermined value to prevent the working fluid from being absorbed therein.

8. In a method of generating power having a quantity of inorganic salts dissolved therein by employing geothermally heated fluid, the improvement comprising the steps of:

supplying a working fluid of a type substantially insoluble in a fluid containing dissolved inorganic salts into direct contact with said geothermally heated fluid to vaporize the working fluid;

expanding the working fluid through a prime mover to generate power; and directing the expanded working fluid into direct contact with a relatively cold heat exchange medium comprising a liquid salt solution to condense said working fluid.

9. In a method in accordance with claim 8 further comprising the step of:

mixing a quantity of inorganic salt with said geothermally heated fluid before the fluid is employed to vaporize the working fluid to maintain the percentage by weight of inorganic salts in said geothermally heated fluid above a predetermined value to prevent the working fluid from being absorbed therein.

10. In a method in accordance with claim 9 further comprising the step of:

mixing a quantity of inorganic salt with said relatively cold heat transfer medium before said medium is employed to condense the expanded working fluid to maintain the percentage by weight of inorganic salts in said relatively cold heat transfer medium above a predetermined value to prevent the working fluid from being absorbed therein.

* * * * *